United States Patent
Koyama et al.

(10) Patent No.: US 6,333,739 B1
(45) Date of Patent: Dec. 25, 2001

(54) DISPLAY APPARATUS, METHOD AND STORAGE MEDIUM FOR DISPLAY CONNECTION STATUS IN A NETWORK

(75) Inventors: Shinichi Koyama, Tokyo; Shinichi Hatae, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/138,549

(22) Filed: Aug. 24, 1998

(30) Foreign Application Priority Data

Aug. 26, 1997 (JP) .................................................. 9-229476

(51) Int. Cl.[7] .................................................. G06F 3/14
(52) U.S. Cl. ................... 345/326; 345/335; 345/340; 707/10; 709/203; 709/217
(58) Field of Search .................. 345/335, 340–342, 345/326, 352, 508, 348; 709/213, 217, 203, 233; 707/10

(56) References Cited

U.S. PATENT DOCUMENTS

| | | | |
|---|---|---|---|
| 5,140,678 | * | 8/1992 | Torres .................................... 345/352 |
| 5,504,921 | * | 4/1996 | Dev ........................................ 709/223 |
| 5,572,640 | * | 11/1996 | Schettler .............................. 345/440 |
| 5,572,652 | * | 11/1996 | Robusto et al. ...................... 345/326 |
| 5,621,789 | * | 4/1997 | McCalmont et al. ................ 379/265 |
| 5,682,487 | * | 10/1997 | Thomson .............................. 345/340 |
| 5,793,366 | * | 8/1998 | Mano et al. .......................... 345/329 |
| 5,845,277 | * | 12/1998 | Pfeil et al. ............................. 707/10 |
| 5,862,404 | * | 1/1999 | Omaga .................................. 709/223 |
| 5,883,621 | * | 3/1999 | Iwamura ............................... 345/348 |
| 5,974,237 | * | 10/1999 | Shurmer et al. ...................... 709/223 |

* cited by examiner

Primary Examiner—Raymond J. Bayerl
Assistant Examiner—Thomas J Joseph
(74) Attorney, Agent, or Firm—Fitzpatrick, Cella, Harper & Scinto

(57) ABSTRACT

In a communication system capable of automatically resetting the communication controlling ID of each device according to a change in the connection configuration of the network, the display position of the display information representing each device is controlled according to the ID information specific to each device. Thus, even in case of a change in the connection status of the plural devices, there can be achieved such control as not to change the display position of the display information representing each device, and as to display whether each device is still connected to the system, whereby the operability of the system can be improved.

30 Claims, 9 Drawing Sheets

| DISPLAY POSITION | UNIQUE ID | NODE ID |
|---|---|---|
| FIRST FROM LEFT SIDE | DVC101 | #0 |
| SECOND FROM LEFT SIDE | DVC102 | #1 |
| THIRD FROM LEFT SIDE | DVC103 | #2 |

FIG. 7

| DISPLAY POSITION | UNIQUE ID | NODE ID |
|---|---|---|
| FIRST FROM LEFT SIDE | DVC101 | #1 |
| SECOND FROM LEFT SIDE | DVC102 | — |
| THIRD FROM LEFT SIDE | DVC103 | #0 |

DISPLAY APPARATUS, METHOD AND STORAGE MEDIUM FOR DISPLAY CONNECTION STATUS IN A NETWORK

BACKGROUND OF THE INVENTION

1. Field of the Invention

The present invention relates to a display apparatus, a method and a computer readable program storage medium therefor, and more particularly to technology of communication with a digital interface.

2. Related Background Art

There has recently been developed a communication system in which a personal computer (PC) is connected with a digital video camera (DVC) through a digital interface and the image taken with the digital video camera is supplied to the personal computer in the form of digital signals and is freely edited on the personal computer.

Among the digital interface technologies usable for constituting such communication system, there is known the IEEE Standard for a High Performance Serial Bus (hereinafter called IEEE 1394 standard).

As an example, in case of connecting the PC with plural DVC's with a digital interface based on the IEEE 1394 standard and editing the image taken in and fetched from each DVC, it is desirable to indicate that the source DVC of the taken image.

Particularly in a system capable of automatically recognizing the connection status of the component devices, such as the communication system based on the IEEE 1394 standard, it is desirable to indicate whether such DVC is still connected to the system.

However, in the communication system based on the IEEE 1394 standard, there has not been proposed a specific method for realizing such functions. In particular, in case of a change in the connection status of the communication system, there has not been proposed a method of displaying whether each device is still connected to the system, without changing the display position of display information (for example icon) of each device.

SUMMARY OF THE INVENTION

An object of the present invention is to solve the above described drawbacks.

Another object of the present invention is to provide a display apparatus capable of effecting control so as to display whether each device is still connected to the system without changing the display position of the display information of each device, in case of a change in the connection status of plural devices, thereby improving the operability of the user.

As a preferred embodiment for such objects, there is disclosed a display apparatus connectable to a system capable of automatically recognizing the connection status of plural devices, the display apparatus comprising:

display means for displaying at least one of display information respectively representing the plural devices; and control means for controlling the display position of the display information based on ID information specific to each of the plural devices.

As another embodiment, there is disclosed a display apparatus, comprising:

display means including a first display area for displaying at least one of display information respectively representing plural devices and a second display area for displaying an image signal isochronous transferred from at least one of the plural devices; and control means for effecting control so as not to change the display position of the first display area even in case of a change in the connection status of the plural devices.

As still another embodiment, there is disclosed a display apparatus connectable to a system capable of automatically recognizing the connection status of plural devices, the display apparatus comprising:

display means for displaying, in at least a display area, the image information respectively transmitted from the plural devices; and control means for effecting control so as not to change the display position of the display area in case of a change in the connection status of the plural devices. Still another object of the present invention is to provide a display method capable of effecting control so as to display whether each device is still connected to the system without changing the display position of the display information of each device, in case of a change in the connection status of plural devices, thereby improving the operability of the user.

As a preferred embodiment for such object, there is disclosed a display method for use in an apparatus connectable to a system capable of automatically recognizing the connection status of plural devices, the method comprising steps of:

displaying display information respectively representing the plural devices; and controlling the display position of the display information based on ID information specific to each of the plural devices.

As another embodiment, there is disclosed a display method comprising steps of:

displaying at least one of display information respectively representing plural devices in a first display area;

displaying an image signal isochronous transferred from at least one of the plural devices in a second display area; and effecting control so as not to change the first display area even in case of a change in the connection status of the plural devices.

As still another embodiment, there is disclosed a display method for use in an apparatus connectable to a system capable of automatically recognizing the connection status of plural devices, the method comprising steps of:

displaying, in at least a display area, the image information transmitted from at least one of the plural devices; and effecting control so as not to change the display position of the display area in case of a change in the connection status of the plural devices.

Still another object of the present invention is to provide a computer readable program storage medium, the program being capable of effecting control so as to display whether each device is still connected to the system without changing the display position of the display information of each device, in case of a change in the connection status of plural devices, thereby improving the operability of the user.

As a preferred embodiment for such object, there is disclosed a computer readable program storage medium, storing a program of a display method for use in an apparatus connectable to a system capable of automatically recognizing the connection status of plural devices, the program comprising steps of:

displaying display information respectively representing the plural devices; and controlling the display position of the display information based on ID information specific to each of the plural devices.

As another embodiment, there is disclosed a computer readable program storage medium, storing a program of a display method comprising steps of:

displaying at least one of display information respectively representing plural devices in a first display area;

displaying an image signal isochronous transferred from at least one of the plural devices in a second display area; and effecting control so as not to change the first display area even in case of a change in the connection status of the plural devices.

As still another embodiment, there is disclosed a computer readable program storage medium storing a program of a display method for use in an apparatus connectable to a system capable of automatically recognizing the connection status of plural devices, the program comprising steps of:

displaying, in at least a display area, the image information transmitted from at least one of the plural devices; and effecting control so as not to change the display position of the display area in case of a change in the connection status of the plural devices.

Still other objects of the present invention, and the features thereof, will become fully apparent from the following detailed description of the embodiments.

DESCRIPTION OF THE PREFERRED EMBODIMENTS

The preferred embodiments of the present invention will now be described in detail hereinafter with reference to the accompanying drawings.

Figure 1:
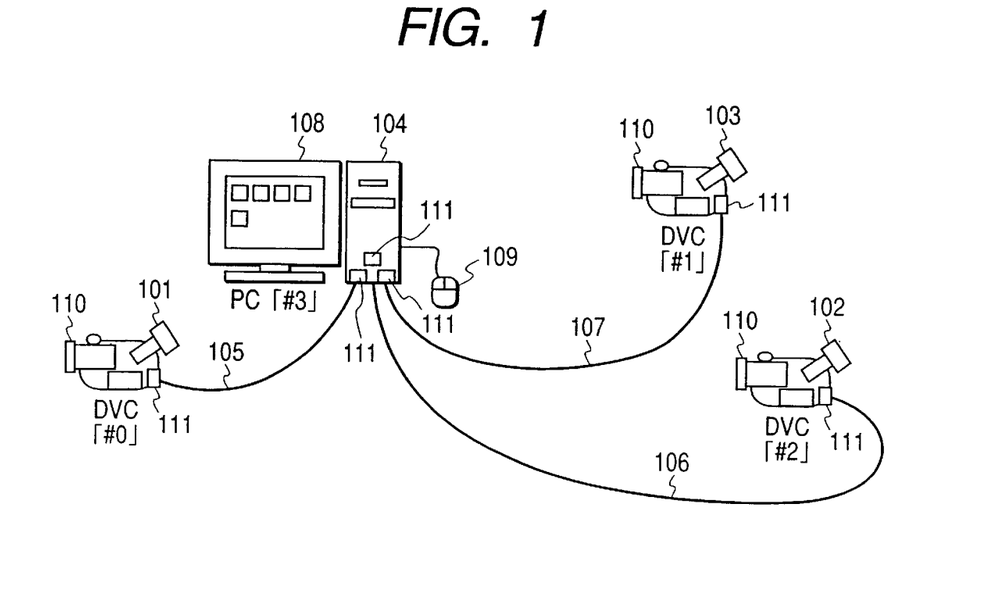
FIG. 1 is a block diagram showing the configuration of a communication system embodying the present invention.

FIG. 1 is a block diagram showing the configuration of a communication system embodying the present invention. The communication system of the present embodiment is a serial bus network constituted with the digital interface based on the IEEE 1394 standard.

In FIG. 1, there are shown digital video cameras (DVC) 101–103 each including an image taking unit 110 for taking the optical image of an object and a digital interface 111 for transmitting the image information taken with the image taking unit, and a personal computer (PC) 104 including a display device 108 capable of displaying the image information from the DVC's 101–103 and information (for example icon) indicating the DVC's 101–103 and an operation device 109 for inputting predetermined operations based on the display image on the display device 108. The PC 104 also has a function of receiving the image information, taken by the DVC's 101–103 through the digital interfaces 111 and editing such image information. Serial bus cables 105–107 are provided for connecting the digital interfaces 111 provided in the DVC's 101–103 and the PC 104.

Figure 2:
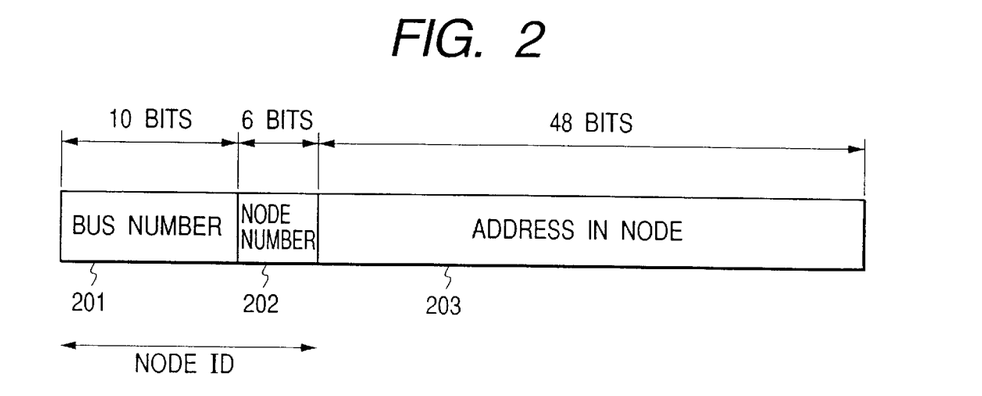
FIG. 2 is a view showing the configuration of the address space equipped in each device.

FIG. 2 shows the configuration of the address space equipped in each device (node).

Referring to FIG. 2, a node ID (201, 202) is set in each of the DVC's 101–103 and the PC 104 by a method based on the IEEE 1394 standard. The node ID mentioned above is reset in case of bus resetting in the communication system shown in FIG. 1 (namely the process of automatically recognizing again the connection configuration of the communication system in response for example to the start of power supply, addition or deletion of a device on the communication system or a request for resetting from a device on the communication system).

Referring to FIG. 2, a node number 202 is represented by 6 bits to enable connection of 63 devices at maximum (sixty-third number being used for broadcasting) in a local communication system. A bus number 201 is represented by 10 bits to enable connection 1023 communication systems (one thousand and twenty-third number being used for indicting a local bus), like the one shown in FIG. 1, through bridges.

Communication between the nodes can be conducted, utilizing the node ID (201, 202) set for each node and a 48-bit address 203 designating the address space of each node. For example, in case the address 203 designates an exchange of command etc., a CTS (command transaction set) is transmitted based on a predetermined protocol (such as AV/C protocol for AV equipment control). Also in case the address 203 designates an address managing the timer provided in each node, the timing of the communication cycle is controlled.

Figure 3:
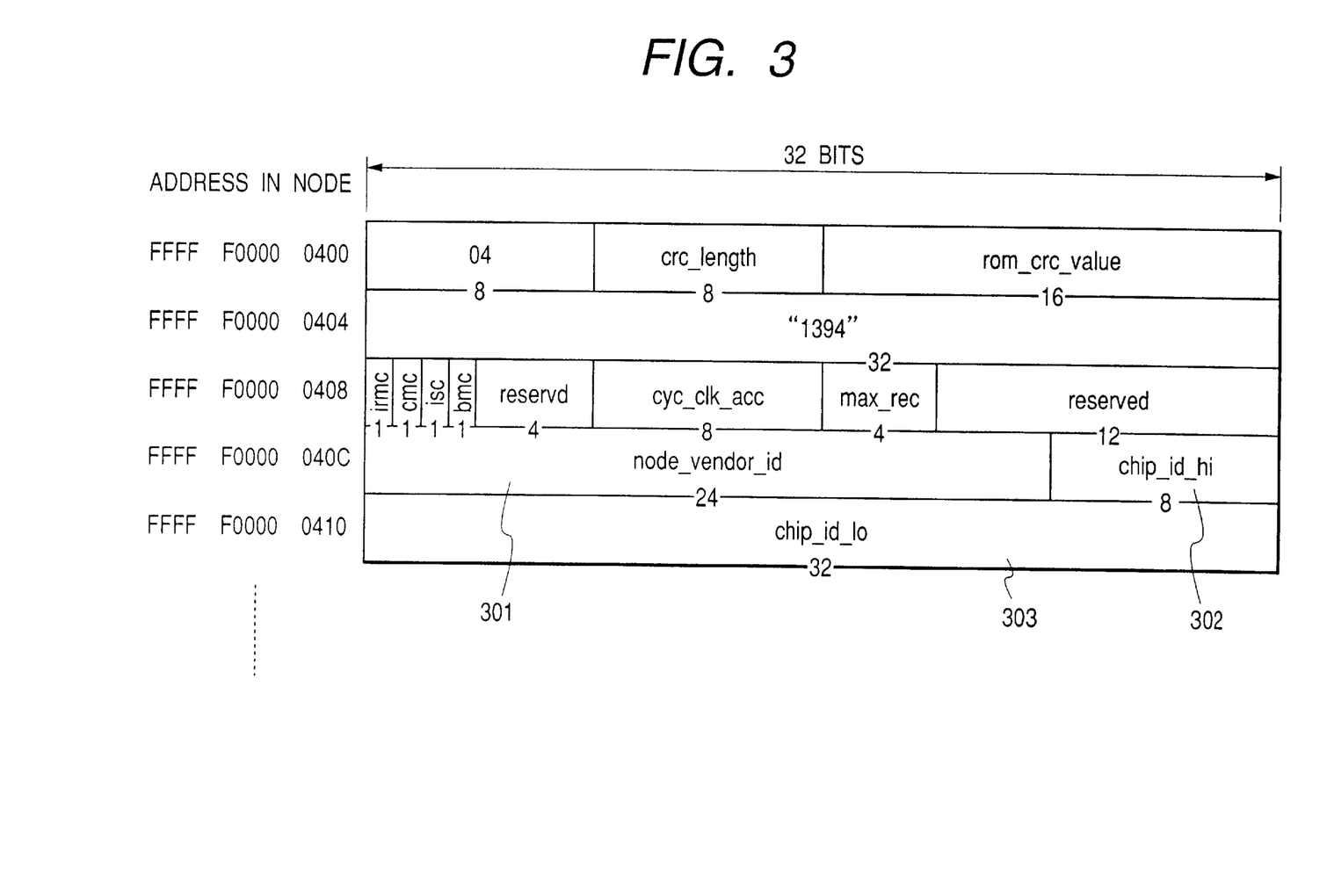
FIG. 3 is a view showing a part of a configuration ROM equipped in each device.

FIG. 3 shows a part of the configuration ROM equipped in each device. Under the IEEE 1394 standard, each node stores its own specific information in the configuration ROM thereof. Each node can read its own ID information (hereinafter called unique ID) from the addresses FFFF F000 040C and FFFF F000 0410 of the configuration ROM.

As shown in FIG. 3, the unique ID stored in the addresses FFFF F000 040C and FFFF F000 0410 are composed of a vendor ID 301 of 3 bytes and a chip ID 302, 303 of 5 bytes. The vendor ID 301 is acquired by each vendor by an application to the IEEE. The chip ID 302, 303 is arbitrarily assigned by each vendor in such a manner that each node has a unique ID. Thus the unit ID (301–303) of each node is fixed and a same ID does not occur in any two nodes.

Figure 4:
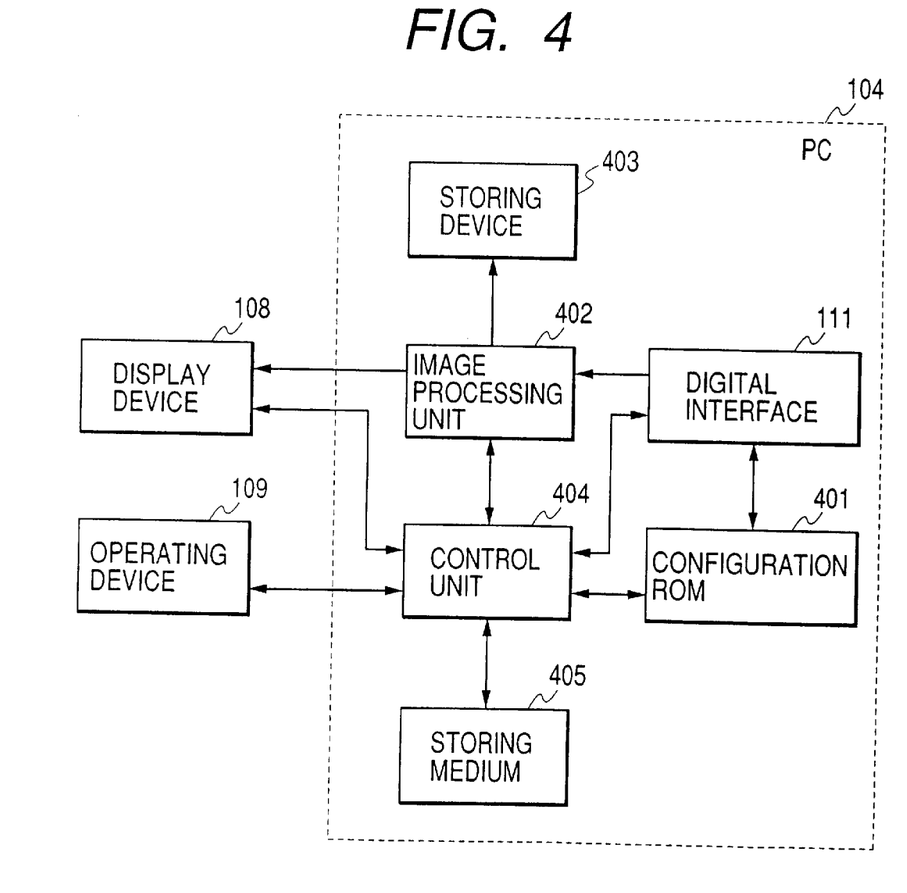
FIG. 4 is a view showing the configuration of a PC 104.

FIG. 4 shows the configuration of the personal computer 104.

In FIG. 4, there are shown a configuration ROM 401, equipped in the PC 104 and partly constructed as shown in FIG. 3; an image processing unit 402 for editing and processing the image information sent by isochronous transfer from various devices and supplying the edited information to a display device 108; a memory device 403 such as a hard disk for storing the image information sent by isochronous transfer from various devices, and also storing the image information processed in the image processing unit 402; a control unit 404 for controlling the function of various process units of the PC 104; and a storage medium 405 storing program codes readable by the control unit 404, the program codes constituting a program for controlling the function of the image processing unit 402 and the display device 108.

The storage medium 405 of the present embodiment can be composed, for example, of a floppy disk, a hard disk, an optical disk, a magnetooptical disk, a CD-ROM, a CD-R, a magnetic tape, a non-volatile memory card or a ROM.

The communication system of the present embodiment, even in case a bus resetting occurs in the course of communication and the node ID's of the devices are changed, can re-start the communication after such bus resetting by inquiring the reset node ID utilizing the unique ID (301–303) inquired in advance to each device.

In constructing the communication system shown in FIG. 1, but resetting is executed at the connection of each of the DVC's 101–103 to the PC 104 and the node ID is set for each device. After the setting of the node ID's of the devices, the digital interface 111 of the PC 104 inquires the vendor ID 301 and the chip ID 302, 303 stored in the addresses FFFF F000 040C and FFFF F000 0410 of the configuration ROM of the DVC's 101–103, utilizing such node ID's. Each of the three DVC's 101–103 returns a response consisting of the unique ID composed of the vendor ID 301 and the chip ID 302, 303 to the PC 104. The control unit 404 of the PC 104 correlates, at each bus resetting, the node ID (201–202) assigned to each node and the unique ID (301–303) assigned to such node and stores and manages such ID's in the memory device 403 such as a hard disk. In the present embodiment, the node ID's set for the DVC's 101–103 and the PC 104 on the communication system shown in FIG. 1 will be explained as #0, #1, #2 respectively for the DVC's 101–103 and #3 for the PC 104.

Figure 5:
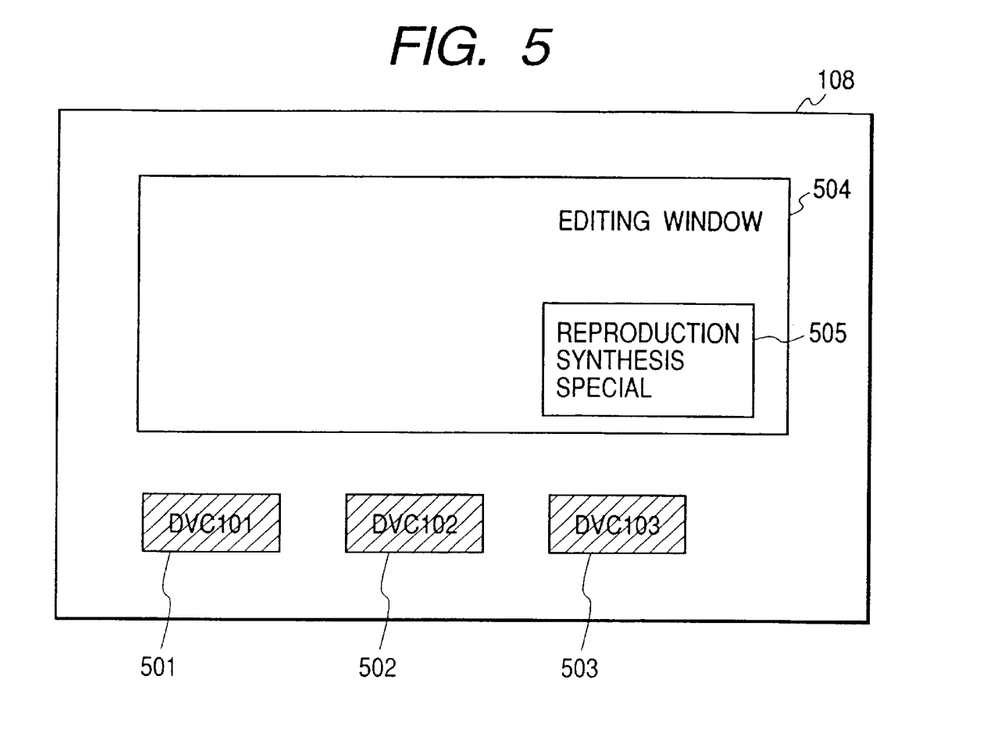
FIG. 5 is a view showing an example of the display image of a display device 108.
Figure 10:
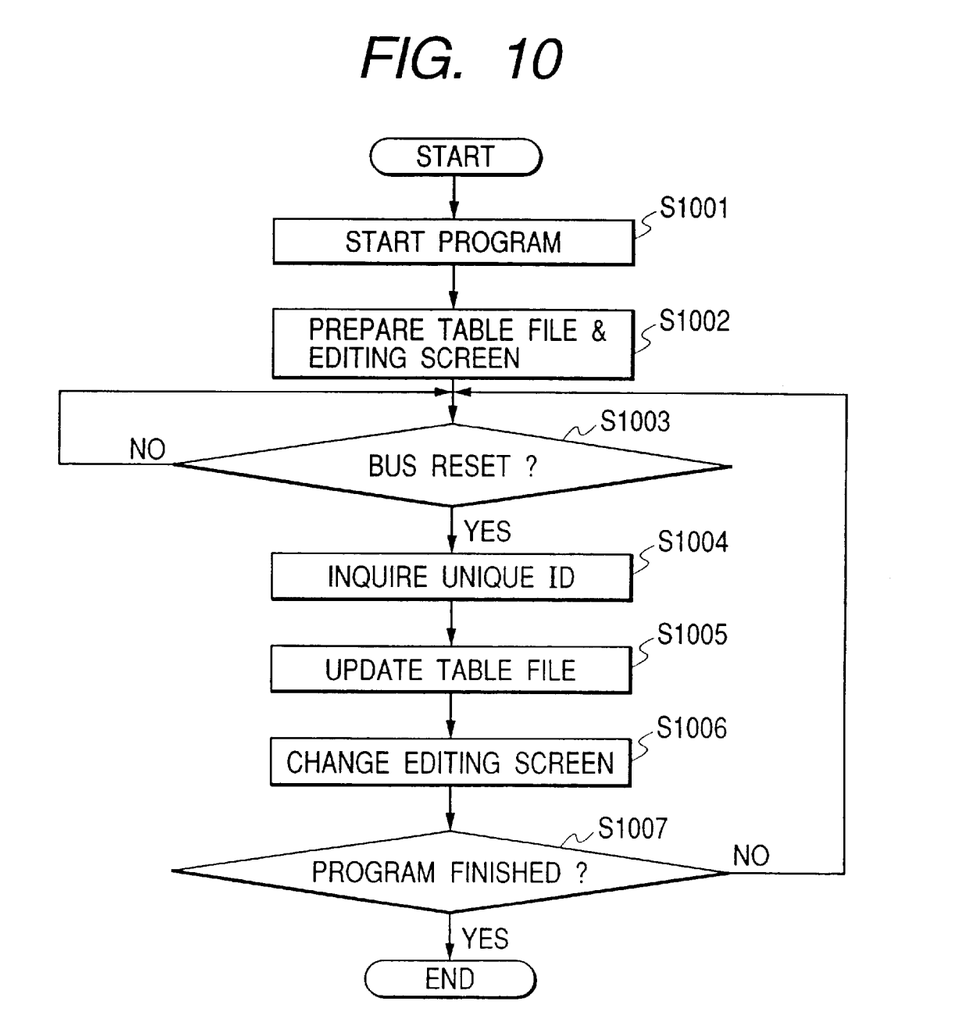
FIG. 10 is a flow chart showing the control sequence of the display device 108.

FIG. 5 is a view showing the image displayed on the display device 108 provided in the PC 104 at the execution of an editing operation. Also, FIG. 10 is a flow chart showing a process operation of the display device 108.

In FIG. 5, there are shown an icon 501 indicating a device with a node ID #0, an icon 502 indicating a device with a node ID #1, an icon 503 indicating a device with a node ID #2, an editing window 504 for displaying, editing and processing the image information taken with the DVC's 101–103, and a command window 505 for instructing the editing/processing operations (for example storage, reproduction, pause, varied-speed reproduction, synthesis, special effect etc.). The icons are displayed in predetermined display positions in the order of the node numbers.

The control unit 404 of the PC 104 starts an editing software (stored in the recording medium 405) for editing or processing the image information taken in the DVC's 101–103 (S1001), prepares the editing image frame composed of the icons 501–503 and the editing window 504 shown in FIG. 5 and causes the display device 108 to display such editing image frame (S1002). The icons 501–503 respectively indicate the devices having the node ID's #0, #1, #2 at the preparation of the editing image frame. In the present embodiment, the icons 501, 502, 503 respectively indicate the DVC's 101, 102, 103 and are displayed in the lower part of the display image, in the order of the node numbers from the left.

Figure 6:
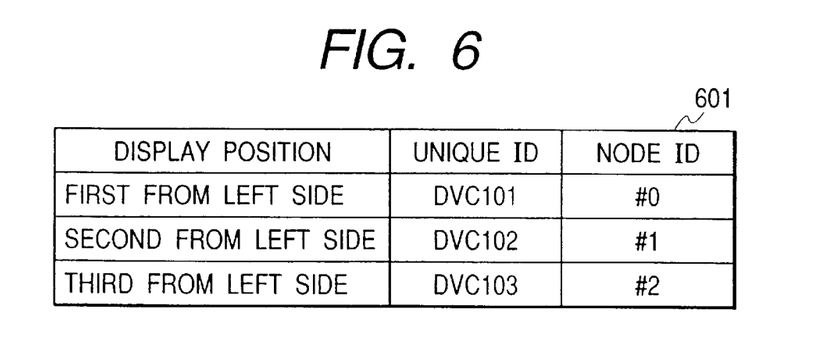
FIG. 6 is a view showing a table file prepared by the PC 104.

Simultaneous with the preparation of the editing image frame, the PC 104 prepares a table file 601 (S1002). Utilizing such table file 601, the PC 104 correlates the positional information indicating the display position of the icons 501–503 and the unique ID's 301–303 of the devices indicated by the icons, thereby enabling to retrieve the node ID set for the device of each unique ID. The table file 601 is stored in the memory device 403 such as a hard disk and is managed by the PC 104. FIG. 6 shows the table file 601 prepared by the PC 104. Utilizing such table file, the PC 104 can control the communication with the icons 501–503 according to the instruction by the user.

Thus the user can designate one of the icons 501–503 in the displayed image by an operation device 109 such as a mouse provided in the PC 104 and transmit a control command for executing an editing operation. As an example, if the user designates the icon 501 displayed in the image and selects "reproduction" from the command window 505, a control command instructing the reproduction of the image information is transmitted to the device (DVC 101) indicated by the icon 501. As a result, the editing window 504 displays the image information reproduced from the DVC 101. Also the user can execute various editing or processing operations on the image information, by entering various control commands from the command window 505 with the operation device 109.

In the following there will be explained a case in which a bus resetting takes place in the course of the editing operations of the user (S1003).

For example, if the DVC 102 is deleted from the communication system, a bus resetting occurs in the communication system shown in FIG. 1, and the re-recognition of the system configuration is started according to the IEEE 1394 standard, whereby each device is given a new node ID which is different from that at the start of the editing operation. After the setting of the new node ID's, the digital interface 111 of the PC 104 inquires, utilizing such node ID's, the unique ID's (each consisting of the vendor ID 301 and the chip ID 302, 303) of the devices (DVC's 101, 103) on the communication system and thus acquires the unique ID of each device.

After acquiring the unique ID of each device, the PC 104 retrieves such unique ID in the table file 601 prepared before the bus resetting, and, upon finding such unique ID, changes the node ID recorded in the table file 601 to the reset node ID (S1005).

Figure 7:
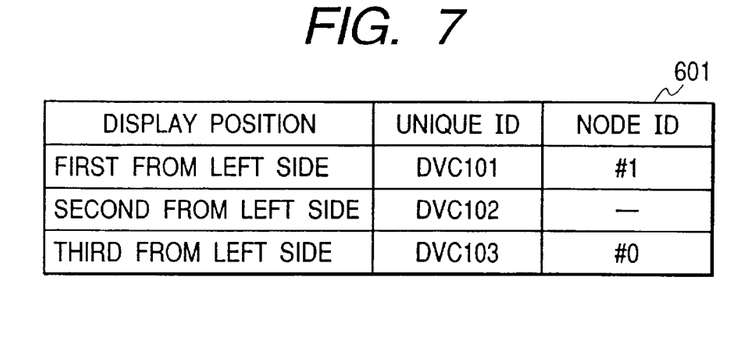
FIG. 7 is a view showing the table file prepared by the PC 104 after the deletion of a DVC 102.

As an example, in case the node ID's reset for the devices after the bus resetting are #1, #0 respectively for the DVC's 101, 103 and #2 for the PC 104, the node ID of the DVC 101 is changed from "#0" to "#1" while that of the DVC 103 is changed from "#2" to "#0" as shown in FIG. 7. As regards the DVC 102, as the corresponding node ID does not exist after the bus resetting, the node ID is changed from "#1" to indicting "no corresponding ID".

Figure 8:
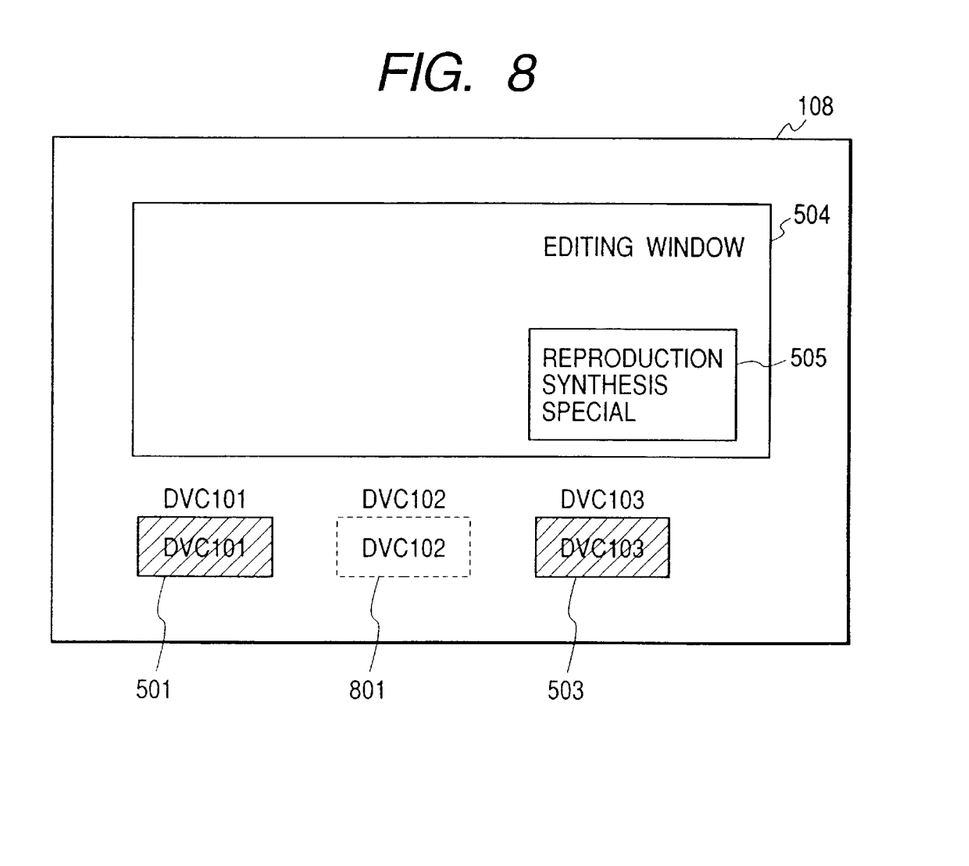
FIG. 8 is a view showing the display image of the display device 108 after the deletion of the DVC 801.

In such case, the icon 502 on the displayed image may be displayed more vaguely than other icons, as indicated by 801 in FIG. 8, thereby indicating the disabled communication with the device indicated by such icon.

Also in case of the addition of a new device (DVC 801) to the communication system, a bus resetting occurs in the communication system shown in FIG. 1, and the re-recognition of the system configuration is started according to the IEEE 1394 standard, whereby each device is given a new node ID which is different from that at the start of the editing operation. After the setting of the new node ID's, the digital interface 111 of the PC 104 inquires, utilizing such node ID's, the unique ID's (each consisting of the vendor ID 301 and the chip ID 302, 303) of the devices on the communication system and thus acquires the unique ID of each device.

After acquiring the unique ID of each device, the PC 104 retrieves such unique ID in the table file 601 prepared before the bus resetting, and, upon finding such unique ID, changes the node ID recorded in the table file 601 to the reset node ID (S1005).

Figure 9:
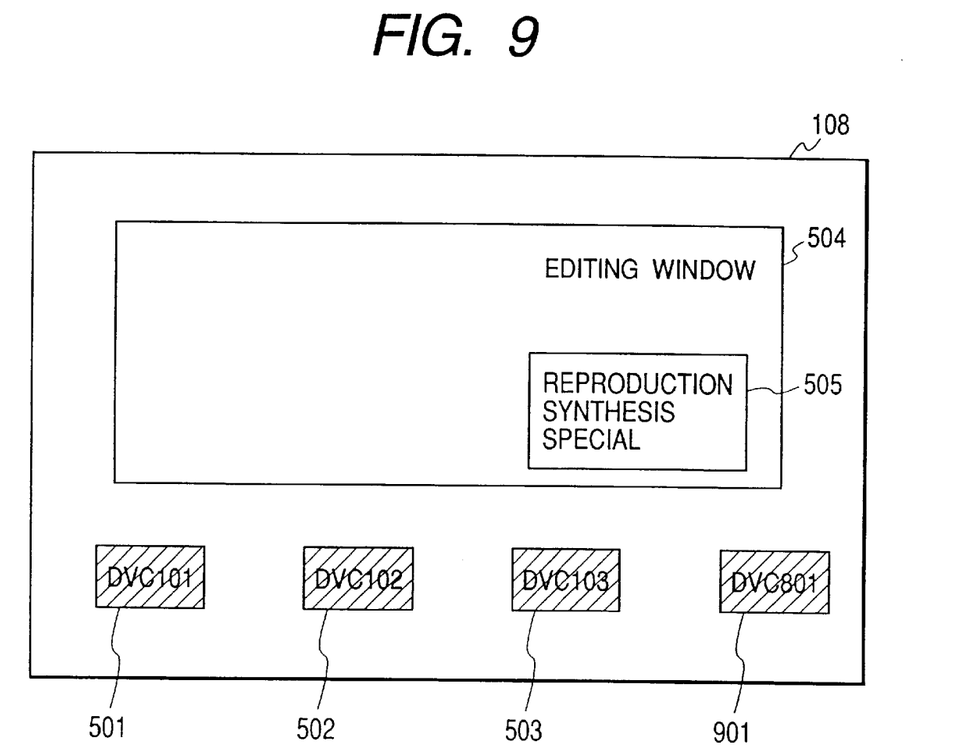
FIG. 9 is a view showing the display image of the display device 108 after the addition of the DVC 801.

If the corresponding unique ID cannot be found in the search of the table file 601 and the corresponding device is identified as a newly added device, the PC 104 generates an icon 901 indicating the device corresponding to such unique ID as shown in FIG. 9 and displays it in a position different from those of the icons 501–503 (S1006). The PC 104 correlates the display position of the icon with the unique ID and the node ID and makes an addition to the table file 601.

Such configuration allows to confirm the correspondence between the display position of the display information (icon) of each device and the node ID thereof, even if the node ID of each device is changed by the bus resetting. It is thus rendered possible to transmit a predetermined command to the device corresponding to an icon, by designating the icon and then designating the command, even in case of a change in the connection status of the communication system.

Also the display positions of the icons are not changed by the bus resetting, and there can be displayed whether each device is still connected to the system, so that it is rendered possible to improve the operability by the user and to prevent the errors in the user operations. Furthermore, the icon of the device of which communication is disabled can be easily identifiable manner.

As explained in the foregoing, in a communication system capable of automatically recognizing the change in the connection status of the network, the present embodiment allows to prepare a table defining the correspondence between the ID information (unique ID) specifying the device on the communication system and the display information (icon) representing such device. Thus, even in a case of a change in the connection status of the network, it is made possible to display whether each device is still connected to the system, without changing the display position of the display information for each device, thereby improving the convenience of use of the system.

The invention may be embodied in other specific forms without departing from the spirit or essential characteristics thereof.

In the foregoing embodiment, the display information representing each device is constituted by an icon, but such form is not essential.

Figure 11A:
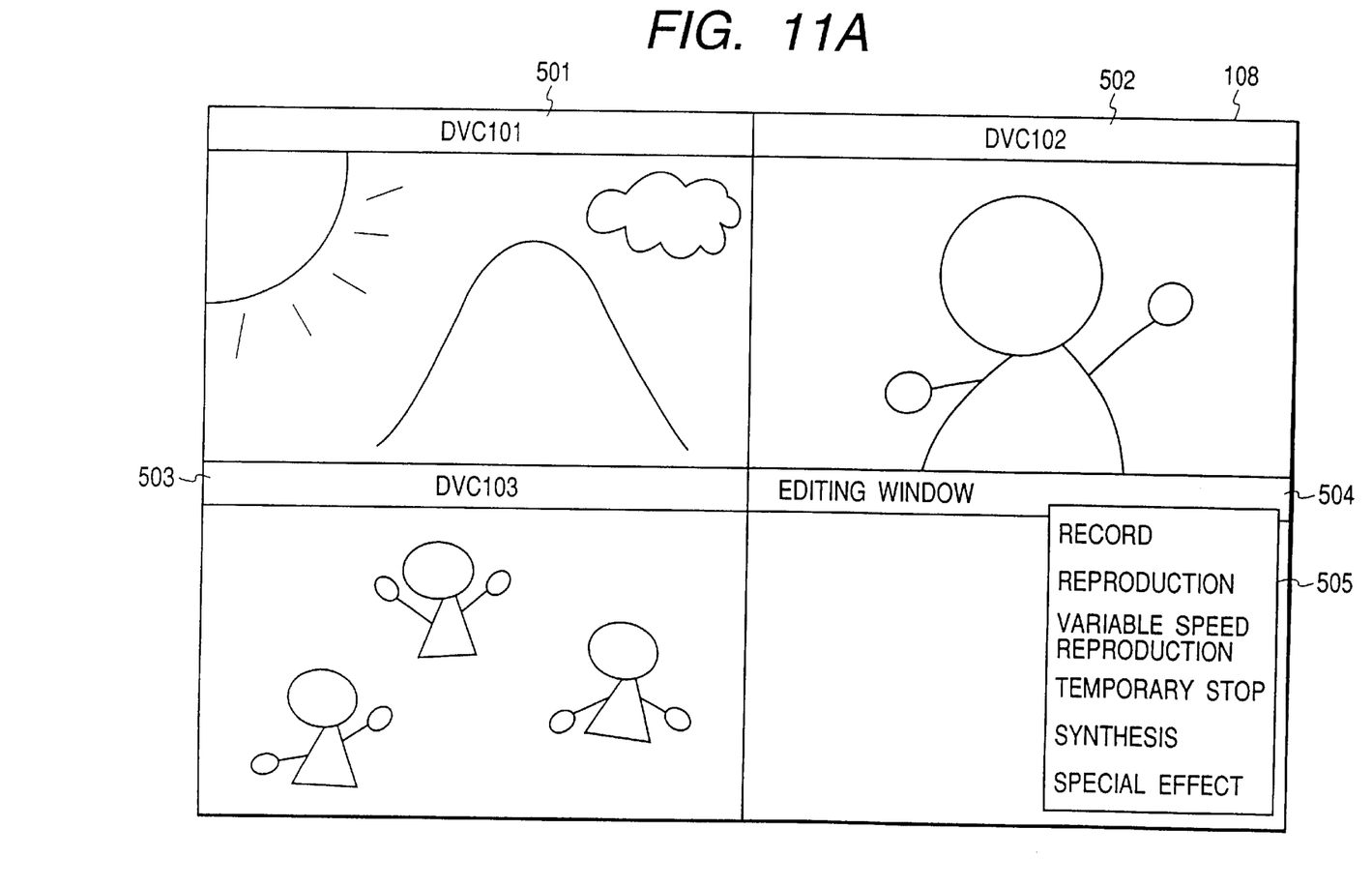
FIGS. 11A and 11B are views showing other examples of the display image of the display device 108.
Figure 11B:
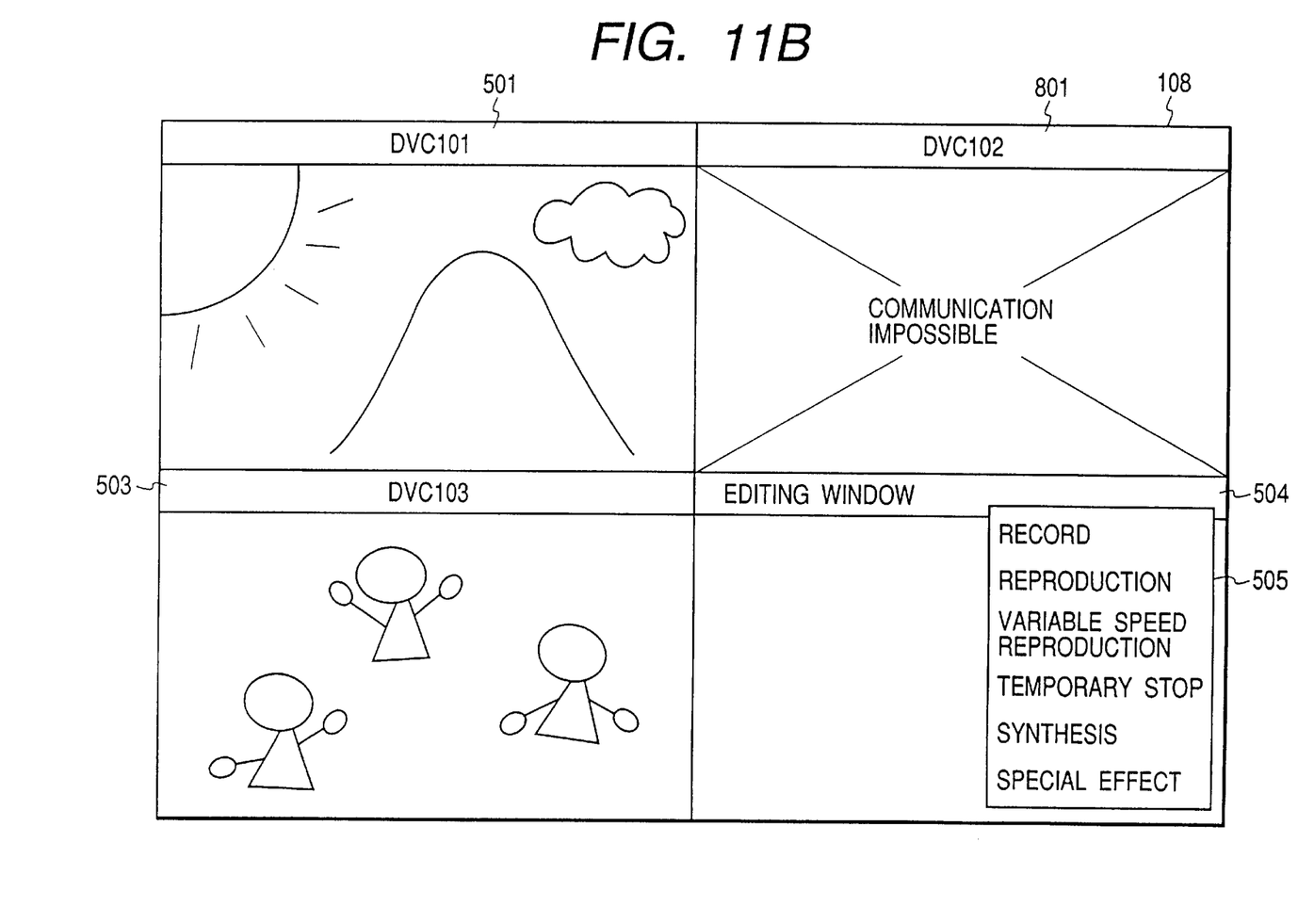

It is for example possible to display a window, directly displaying the image information of each device, instead of the icon and not to change the display position of each window before and after the bus resetting. For example, the displays shown in FIGS. 5 and 8 may be respectively modified as shown in FIGS. 11A and 11B. In the examples shown in FIGS. 11A and 11B, the editing/processing operation is conducted on the editing window. It is thus rendered possible to conduct the editing/processing operations while observing the image information of various devices, thereby improving the convenience of use of the system.

Also in the foregoing embodiment, the icon of each device is displayed in a predetermined position, but it may also be displayed in an arbitrary position to be designated by the user. In such case the PC 104 stores the position designated by the user in the table file 601, forming correspondence with the unique ID and the node ID.

Also in the foregoing embodiment, the PC 104 is connected with the display device 108 and the operation device 109 through ordinary cables, but such form is not essential. It is for example possible to provide the display device 108 and the operation device 109 with digital interfaces and to connect such interfaces with the digital interface equipped in the PC 104.

Furthermore, the program codes stored in the memory medium 405 of the present embodiment may be stored in advance therein, or may be supplied from the exterior through the digital interface 111 and stored in the memory medium 405.

Furthermore, there may also be adopted a configuration in which the program codes read from the memory medium 405 are stored in a memory provided in a function expansion board or a function expansion unit connected to the control unit 405 and a control unit equipped in such function expansion board or function expansion unit controls the function of the PC 104 and the display device 108 according to the instructions of such program codes.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An apparatus capable of automatically recognizing a connection status of external devices, the apparatus comprising:

recognition means for automatically recognizing the connection status of the external devices;

control means for controlling a display device so as to display information corresponding to the external devices and image information transmitted from at least one of the external devices; and image processing means for processing the image information displayed on the display device, wherein said control means does not change the position of the device information displayed on the display device when said recognition means automatically recognizes a new connection status of the external devices.

2. A display apparatus according to claim 1, further comprising storing means for storing position information representing the position of the device information and ID information corresponding to the external devices in mutual correspondence.

3. A display apparatus according to claim 1, wherein said recognition means automatically recognizes the connection status of the external devices using a communication interface in accordance with the IEEE 1394 standard.

4. An apparatus according to claim 1, wherein said recognition means automatically recognizes the connection status of the external devices when one of the external devices is disconnected.

5. An apparatus according to claim 1, wherein said recognition means automatically recognizes the connection status of the external devices when a new external device is connected.

6. A method of controlling an apparatus capable of automatically recognizing a connection status of external devices, the method comprising steps of:
   controlling a display device so as to display information corresponding to the external devices and an image information transmitted from at least one of the external devices; and
   processing the image information displayed on the display device, wherein
   the control step does not change the position of the device information displayed on the display device when the apparatus automatically recognizes a new connection status of the external devices.

7. A method according to claim 6, wherein the apparatus automatically recognizes the connection status of the external devices when one of the external devices is disconnected.

8. A method according to claim 6, wherein the apparatus automatically recognizes the connection status of the external devices when a new external device is connected.

9. A method according to claim 6, further comprising the step of storing position information representing the position of the device information and ID information corresponding to the external devices in mutual correspondence.

10. A method according to claim 6, wherein the apparatus automatically recognizes the connection status of the external devices using a communication interface in accordance with IEEE 1394.

11. A medium storing a program for controlling an apparatus capable of automatically recognizing a connection status of external devices, the program comprising the steps of:
   controlling a display device so as to display information corresponding to the external devices and an image information transmitted from at least one of the external devices; and
   processing the image information displayed on the display device, wherein
   the control step does not change the position of the device information displayed on the display device when the apparatus automatically recognizes a new connection status of the external devices.

12. A medium according to claim 11, wherein the apparatus automatically recognizes the connection status of the external devices when one of the external devices is disconnected.

13. A medium according to claim 11, wherein the apparatus automatically recognizes the connection status of the external devices when a new external device is connected.

14. A medium according to claim 11, further comprising the step of storing position information representing the position of the device information and ID information corresponding to the external devices in mutual correspondence.

15. A medium according to claim 11, wherein the apparatus automatically recognizes the connection status of the external devices using a communication interface in accordance with IEEE 1394.

16. An apparatus which automatically recognizes a connection status of external devices, the apparatus comprising:
   control means for controlling a display device so as to display information corresponding to the external devices and image information transmitted from at least one of the external devices; and
   image processing means for processing the image information displayed on the display device, wherein
   said control means does not change the order of the device information displayed on the display device when recognition means automatically recognizes a new connection status of the external devices.

17. An apparatus according to claim 16, wherein said recognition means automatically recognizes the connection status of the external devices when one of the external devices is disconnected.

18. An apparatus according to claim 16, wherein said recognition means automatically recognizes the connection status of the external devices when a new external device is connected.

19. An apparatus according to claim 16, further comprising storing means for storing position information representing the position of the device information and ID information corresponding to the external devices in mutual correspondence.

20. An apparatus according to claim 16, wherein said recognition means automatically recognizes the connection status of the external devices using a communication interface in accordance with IEEE 1394.

21. A method of controlling an apparatus which automatically recognizes a connection status of external devices, the method comprising the steps of:
   controlling a display device so as to display information corresponding to the external devices and image information transmitted from at least one of the external devices; and
   processing the image information displayed on the display device, wherein
   the control step does not change the order of the device information displayed on the display device when the apparatus automatically recognizes a new connection status of the external devices.

22. A method according to claim 21, wherein the apparatus automatically recognizes the connection status of the external devices when one of the external devices is disconnected.

23. A method according to claim 21, wherein the apparatus automatically recognizes the connection status of the external devices when a new external device is connected.

24. A method according to claim 21, further comprising the step of storing position information representing the position of the device information and ID information corresponding to the external devices in mutual correspondence.

25. A method according to claim 21, wherein the apparatus automatically recognizes the connection status of the external devices using a communication interface in accordance with IEEE 1394.

26. A medium storing a program for controlling an apparatus which automatically recognizes a connection status of external devices, the program comprising the steps of:
   controlling a display device so as to display information corresponding to the external devices and image information transmitted from at least one of the external devices; and
   processing the image information displayed on the display device, wherein the control step does not change the order of the device information displayed on the display device when the apparatus automatically recognizes a new connection status of the external devices.

27. A medium according to claim 26, wherein the apparatus automatically recognizes the connection status of the external devices when one of the external devices is disconnected.

28. A medium according to claim 26, wherein the apparatus automatically recognizes the connection status of the external devices when a new external device is connected.

29. A medium according to claim 26, further comprising the step of storing position information representing the position of the device information and ID information corresponding to the external devices in mutual correspondence.

30. A medium according to claim 26, wherein the apparatus automatically recognizes the connection status of the external devices using a communication interface in accordance with IEEE 1394.

* * * * *

UNITED STATES PATENT AND TRADEMARK OFFICE
CERTIFICATE OF CORRECTION

PATENT NO. : 6,333,739 B1
DATED : December 25, 2001
INVENTOR(S) : Shinichi Koyama et al.

It is certified that error appears in the above-identified patent and that said Letters Patent is hereby corrected as shown below:

Column 4,
Line 37, "indicting" should read -- indicating --.

Column 7,
Line 35, "identifiable manner." should read -- identified. --.

Signed and Sealed this

Second Day of July, 2002

*Attest:*

*Attesting Officer*

JAMES E. ROGAN
*Director of the United States Patent and Trademark Office*